(12) United States Patent
Kamler

(10) Patent No.: US 8,434,777 B2
(45) Date of Patent: May 7, 2013

(54) PIVOTING BICYCLE LINK

(76) Inventor: Arnold Kamler, Montville, NJ (US)

( * ) Notice: Subject to any disclaimer, the term of this patent is extended or adjusted under 35 U.S.C. 154(b) by 0 days.

(21) Appl. No.: 13/536,534

(22) Filed: Jun. 28, 2012

(65) Prior Publication Data

US 2013/0001920 A1 Jan. 3, 2013

Related U.S. Application Data

(60) Provisional application No. 61/503,878, filed on Jul. 1, 2011.

(51) Int. Cl.
*B62K 27/12* (2006.01)
(52) U.S. Cl.
USPC .......................................................... 280/292
(58) Field of Classification Search .................. 280/204, 280/292
See application file for complete search history.

(56) References Cited

U.S. PATENT DOCUMENTS

| 3,993,321 | A | * | 11/1976 | Cote | 280/204 |
|---|---|---|---|---|---|
| 5,749,592 | A | * | 5/1998 | Marchetto | 280/292 |
| 5,785,335 | A | * | 7/1998 | George | 280/204 |
| 6,286,847 | B1 | * | 9/2001 | Perrin | 280/204 |
| 6,290,246 | B1 | * | 9/2001 | Lin | 280/204 |
| 6,663,126 | B2 | * | 12/2003 | Britton et al. | 280/204 |
| 6,983,947 | B2 | * | 1/2006 | Asbury et al. | 280/204 |
| 7,234,719 | B2 | * | 6/2007 | Giese | 280/292 |
| 7,766,358 | B1 | * | 8/2010 | Phillips | 280/204 |
| 8,091,908 | B2 | * | 1/2012 | Wilson et al. | 280/204 |
| 8,157,279 | B2 | * | 4/2012 | Sather | 280/204 |
| 8,282,117 | B2 | * | 10/2012 | Rodgers | 280/204 |
| 2003/0011170 | A1 | * | 1/2003 | Humes | 280/504 |

* cited by examiner

*Primary Examiner* — Tony Winner
(74) *Attorney, Agent, or Firm* — Fitch, Even, Tabin & Flannery, LLP

(57) ABSTRACT

A pivoting bicycle link is provided for interconnecting a bicycle and a wheeled device pulled behind the bicycle. The pivoting bicycle link includes a first portion, a second portion, a pivot and a collar. The first portion is configured to operably couple the link to a portion of the bicycle. The second portion is configured to operably couple the link to the wheeled device. The pivot is located to permit the link to move about two axes. The collar is configured to operably couple the pivot to at least one of the first and second portions. The collar has a length configured to limit compression of the pivot.

20 Claims, 12 Drawing Sheets

PIVOTING BICYCLE LINK

CROSS-REFERENCE TO RELATED APPLICATION

This application claims benefit of U.S. Provisional Application No. 61/503,878, filed Jul. 1, 2011, which is hereby incorporated herein by reference in its entirety.

FIELD

The present application relates to a bicycle link connection, such as for towing a wheeled trolley, and more particularly, to a pivoting bicycle link connection for towing a wheeled trolley, such as a ride along bicycle trainer, behind a bicycle.

BACKGROUND

Strollers and trolleys are popular for transporting children such as when used as trailers towed behind a bicycle. Similarly, ride behind bicycles, such as the WeeRide Co-Pilot, are pulled behind another bicycle to help train a user to ride a bicycle. For comfort and safety of the users, it is generally preferred to include a movable linkage such that the wheeled trailer is permitted to move somewhat independently from the bicycle that it is being towed behind.

In this regard, pivots have been developed to permit the wheeled trailer to pivot relative to the towing bicycle. However, the pivots are often susceptible to binding or restricted movement of the pivot due to assembly and over-tightening of the pivot. For example, when the pivot is manufactured or when it is serviced when in use, it is possible to over tighten the support structure about the pivot, thereby causing binding, restricted movement and/or increased wear on the pivot and associated structures.

Furthermore, the linkages are often permanently secured to at least one of the wheeled trailer and/or the towing bicycle. Similarly, even if not permanently secured, it is often time consuming and cumbersome to disassemble the linkage to separate the wheeled trailer from the bicycle. In this regard, numerous tools may be required to loosen and remove fasteners securing the linkage and/or the wheeled trailer being towed behind the bicycle.

SUMMARY

In one form, a pivoting bicycle link is provided for interconnecting a bicycle and a wheeled device pulled behind the bicycle. The pivoting bicycle link includes a first portion, a second portion, a pivot and a collar. The first portion is configured to operably couple the link to a portion of the bicycle. The second portion is configured to operably couple the link to the wheeled device. The pivot is located to permit the link to move about two axes. The collar is configured to operably couple the pivot to at least one of the first and second portions. The collar has a length configured to limit compression of the pivot.

According to one form, a pivoting bicycle link is provided for interconnecting a bicycle and a wheeled device pulled behind the bicycle. The pivoting bicycle link includes a first portion, a second portion, a pivot and a quick release. The first portion is configured to operably couple the link to a portion of the bicycle. The second portion is configured to operably couple the link to the wheeled device. The pivot is located to permit the link to move about two axes. The quick release configured to permit the first portion to be separated from the second portion.

In accordance with one form, a pivoting bicycle link is provided for interconnecting a bicycle and a wheeled device pulled behind the bicycle. The pivoting bicycle link includes a first portion, a second portion, at least one pivot, a generally U-shaped portion and a collar. The first portion is configured to operably couple the link to the bicycle. The second portion is configured to operably couple the link to the wheeled device. The at least one pivot located between the first and second portions to permit the link to move about at least one two axes. The generally U-shaped portion includes first and second generally opposing arms to receive at least a portion of one pivot therebetween. The first arm defines a first opening and the second arm defines a second opening. The collar is configured to extend between the first and second generally opposing arms and through the pivot. The collar includes a first collar portion having a first flange and a second collar portion having a second flange. The first collar portion is positioned in the first opening and contacts the first arm. The second collar portion is positioned in the second opening and contacts the second arm. The first and second collar portions contact one another such that the first and second collar portions have a length between the first and second flanges configured to limit compression of the U-shaped portion.

In one form, the first portion is configured to releasably connect to the portion of the bicycle.

In accordance with one form, the second portion is integral with the wheeled deice.

According to one form, the pivoting bicycle link further includes a bushing at the pivot to reduce friction at the pivot.

In one form, the pivot is a universal joint.

In accordance with one form, the pivot includes two pivoting linkages, each of the pivoting linkages including a collar.

According to one form, the collar includes a first collar end having a first flange, a second collar end having a second flange and a fastener to couple the first and second collar ends to one another.

These and other aspects may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
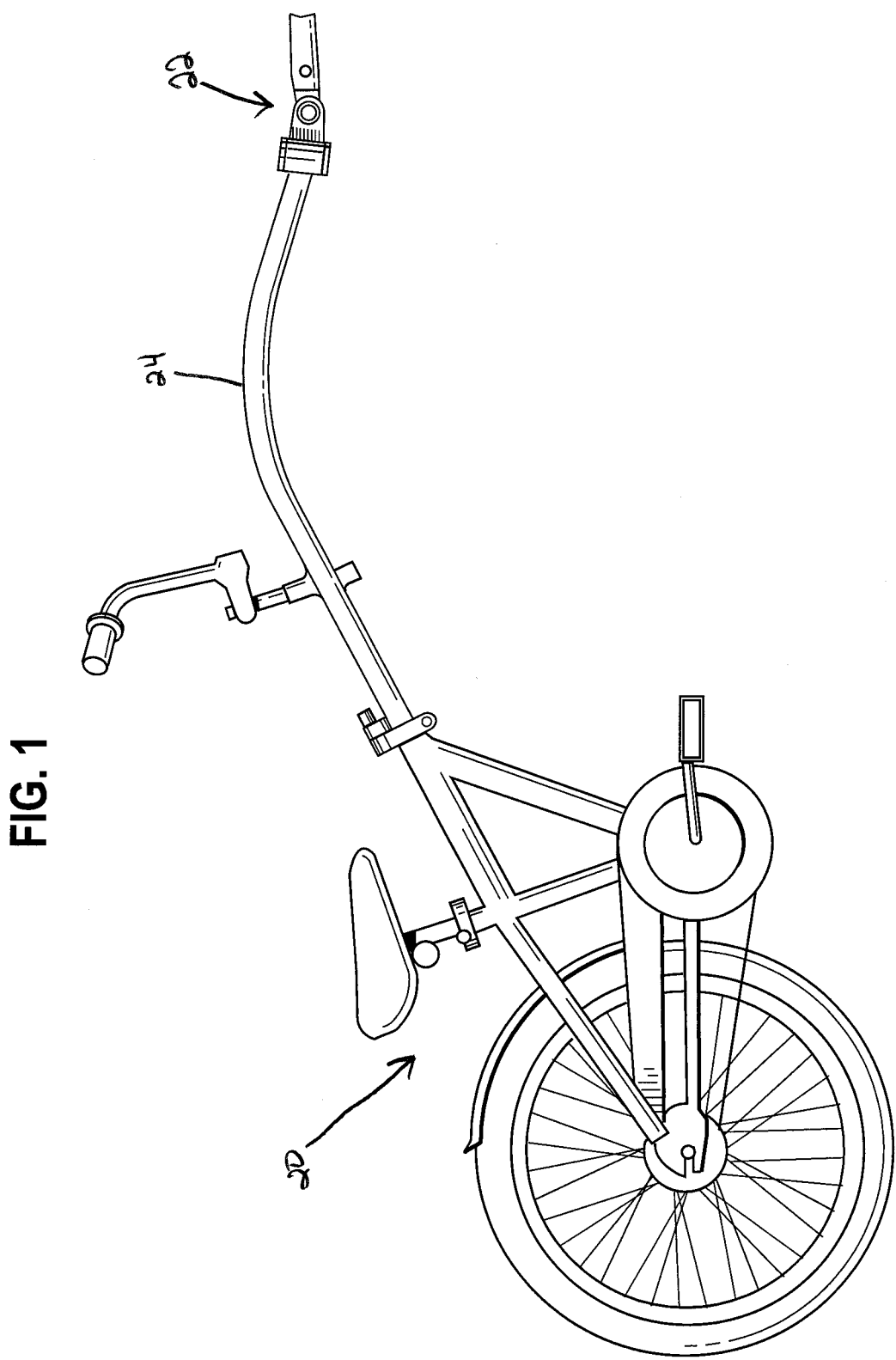
FIG. 1 is a side perspective view of a pivoting bicycle link interconnecting a bicycle with a wheeled device.

Referring to FIG. 1, there is illustrated a wheeled trailer, such as a training bicycle 20, being pulled behind a towing bicycle (not shown) via a pivoting bicycle link 22. In one form, the link 22 may be coupled to the seat post of the bicycle. For example, as found in U.S. Ser. No. 13/489,869, which is hereby incorporated by reference in its entirety, a jogging stroller may be coupled by a link to the seat post of the bicycle. It should be understood that the link 22 may be coupled to other portions of the bicycle, such as the rear axle and the like. Further, in one form, as illustrated in FIG. 1, the link 22 is integral with the wheeled training bicycle. Alternatively, it should be understood that the link 22 may also be operably coupled to the wheeled training bicycle 20, or other wheeled trailer, such that the link may be selectively removed therefrom.

In one form, such as shown in FIG. 1, the link 22 may include a trailer arm 24 extending therefrom. The trailer arm 24 may be integral with the link 22 or may otherwise be removable therefrom. The trailer arm 24 may take a variety of shapes. For example, as illustrated in FIG. 1, the trailer arm 24 is generally arc shaped. It should be understood that the trailer arm 24 may include any number of differently shaped portions, such as straight or angled portions as well as substantially arc shaped portions. In one form, the trailer arm 24 may be shaped and sized to accommodate any number of different bicycles as well as configured to attach to a number of different positions on the bicycle. In one form, the trailer arm 24 is shaped such that when installed to a bicycle seat post, the trailer arm 24 is clear to pivot about a rear bicycle wheel.

As illustrated in the figures, the link 22 may include a first portion 26, a second portion 28, a pivot 30, a generally U-shaped portion 32 and a collar 34. The first portion 26 is configured to operably couple the link 22 to a portion of the bicycle. The second portion 28 is configured to operably couple the link 22 to the wheeled trailer. The pivot 30 is located to permit the link 22 to move about at least one axis. As shown in the figures, in one form, the link 22 includes two pivot points to permit the link 22 to move about two axes. The pivot 30 may be configured to move about any number of different axes, such as a single axis or an infinite number of axes, such as in the form of a universal joint. In one form, such as best see in FIG. 7, the link 22 may include multiple U-shaped portions 32,38. The collar 34 is configured to operably couple the pivot 30 to at least one of the first and second portions 26,28. Further, in one form, the collar 34 has a length configured to limit compression of the pivot 30 as will be discussed in more detail below.

As illustrated in FIG. 1, the link 22 may be removably coupled to the bicycle (not shown) via the first portion 26. The first portion 26 may be coupled to the bicycle in a variety of manners and in any number of different locations. For example, as illustrated in FIG. 1, the first portion 26 includes a connector 40 having two flanges 42,44 that are configured to couple to a portion of the bicycle, such as the seat post. The connector further includes fasteners 46 to secure the flanges 42,44 to one another.

Figure 7:
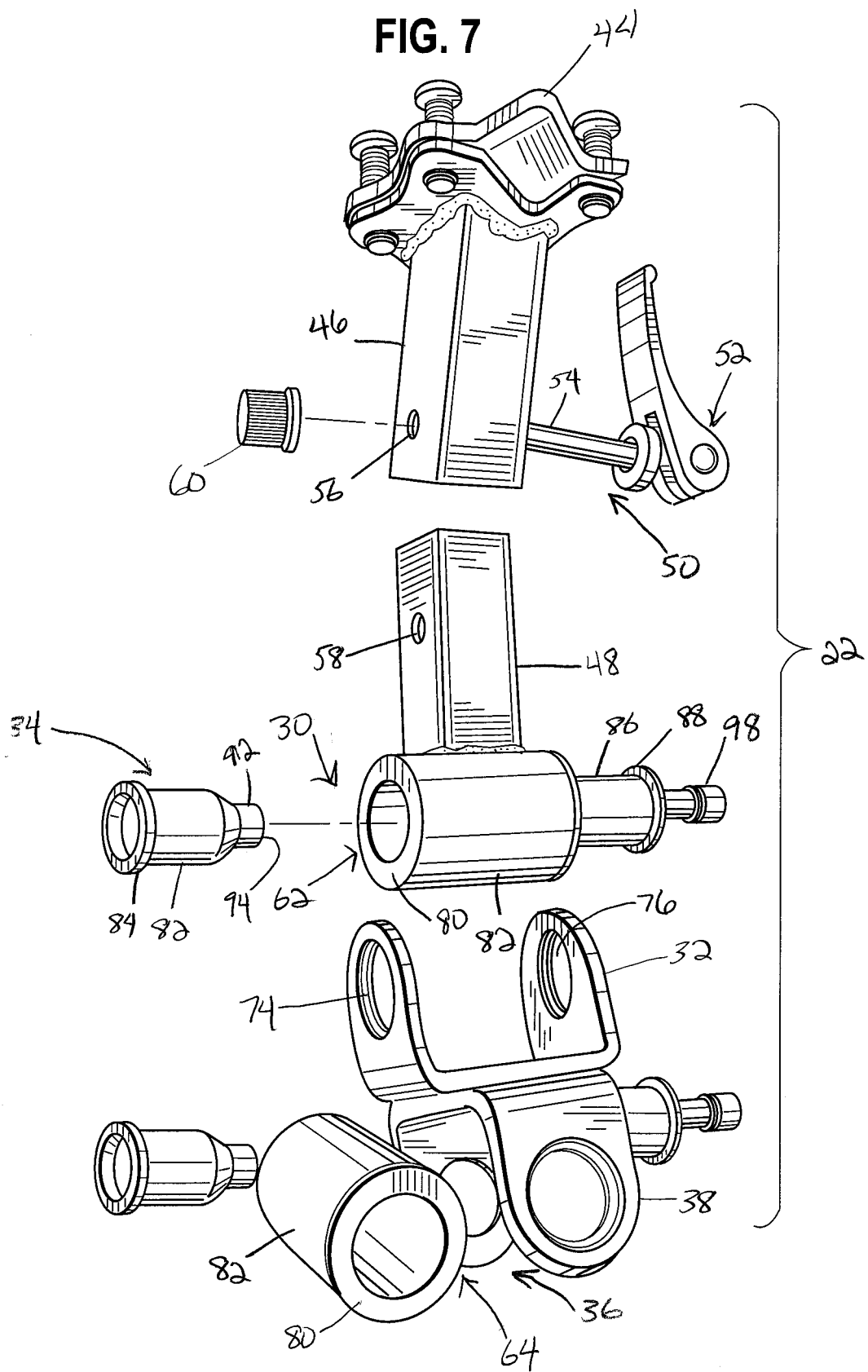
FIG. 7 is an exploded view of one form of a pivoting bicycle link.
Figure 8:
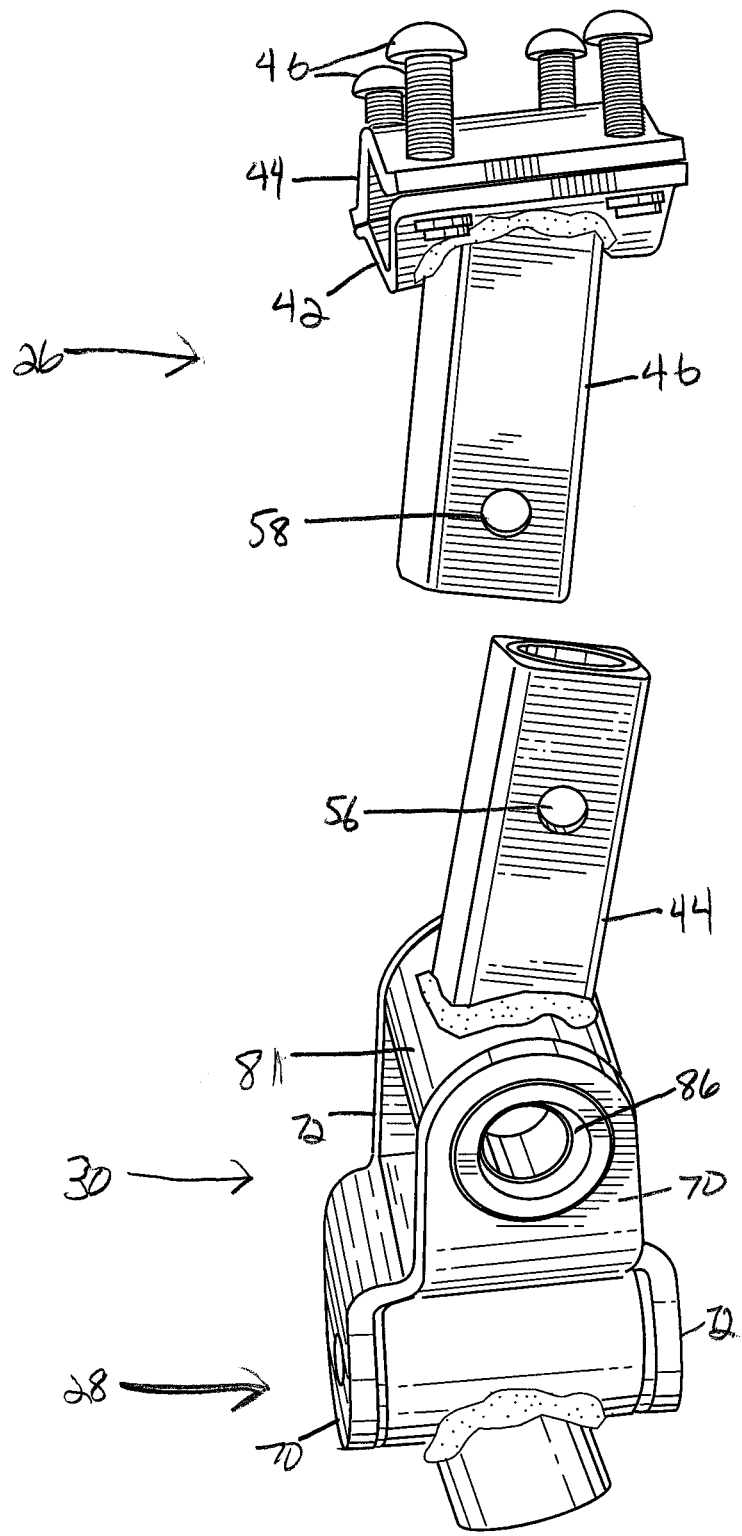
FIG. 8 is a partial exploded view showing the first portion separated from the second portion.

Further, in one form, as seen in the exploded view of FIG. 7, the first portion 26 may include a female portion 47 which includes the connector 40. The female portion 47 is configured to receive a male portion 48 therein. It should be noted that the first portion 26 may alternatively include the male portion. Furthermore, it should be noted that the first portion may also be integral such that there does not need to be a male and/or a female portion. However, having the female portion 47 and the male portion 48 is one approach for providing at least a portion of the link 22 as being removable from the bicycle and/or wheeled trailer, as discussed below.

In one form, such as seen in FIG. 7, the first portion 26 may include a quick release 50 so the male portion 48 may be quickly disconnected from the female portion 47 to separate the wheeled trailer from the bicycle. In this regard, the quick release 50 may include a cam assembly 52 coupled to a rod 54 which extends through openings 56,58 and is secured by a nut 60. It should be understood that other forms of connectors may be used to couple the link 22 to the bicycle.

Figure 11:
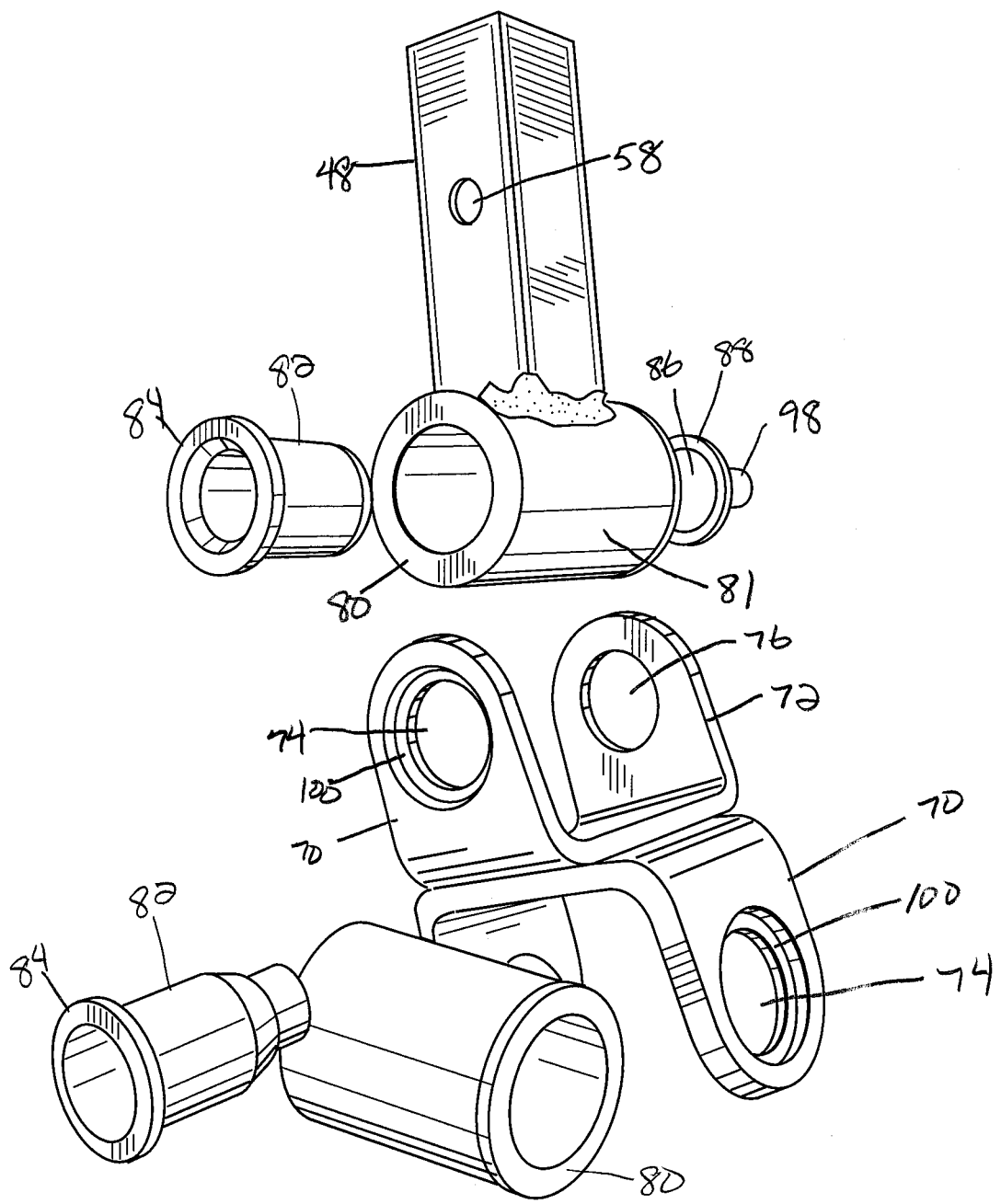
FIG. 11 is a side view of the second portion with the pivot completely disassembled.
Figure 12:
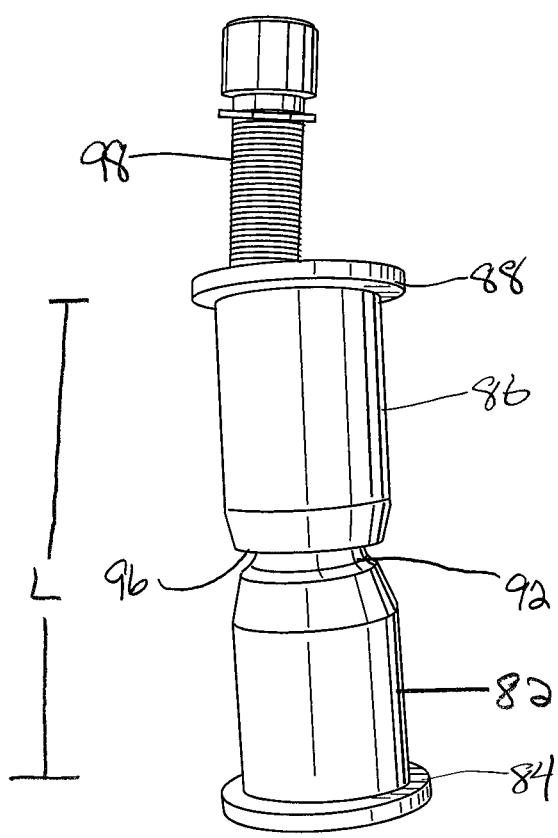
FIG. 12 is a side view of a collar.

As illustrated in the figures, the link 22 includes the pivot 30, which may include one or more pivoting linkages. As shown in FIG. 11, the pivot includes two pivoting linkages 62,64. In one form, the pivot 30 is configured to permit the link 22 to pivot about at least two axes. For example, as the bicycle turns around a corner or begins ascending or descending a slope, the pivot 30 permits the bicycle to pivot relative to the link 22 and/or the wheeled trolley. This pivoting motion may help lower the amount of stress placed on the bicycle, tow link 22 and wheeled trolley. Further, in one form, link 22 may also include a stopper (not shown) to limit overrotation at the pivot. Furthermore, the link 22 may include a universal joint or other similar structure to permit movement of the link 22 relative to the bicycle. It should be understood that other forms of pivots, connectors, stoppers and the like may be used as part of the link.

Figure 2:
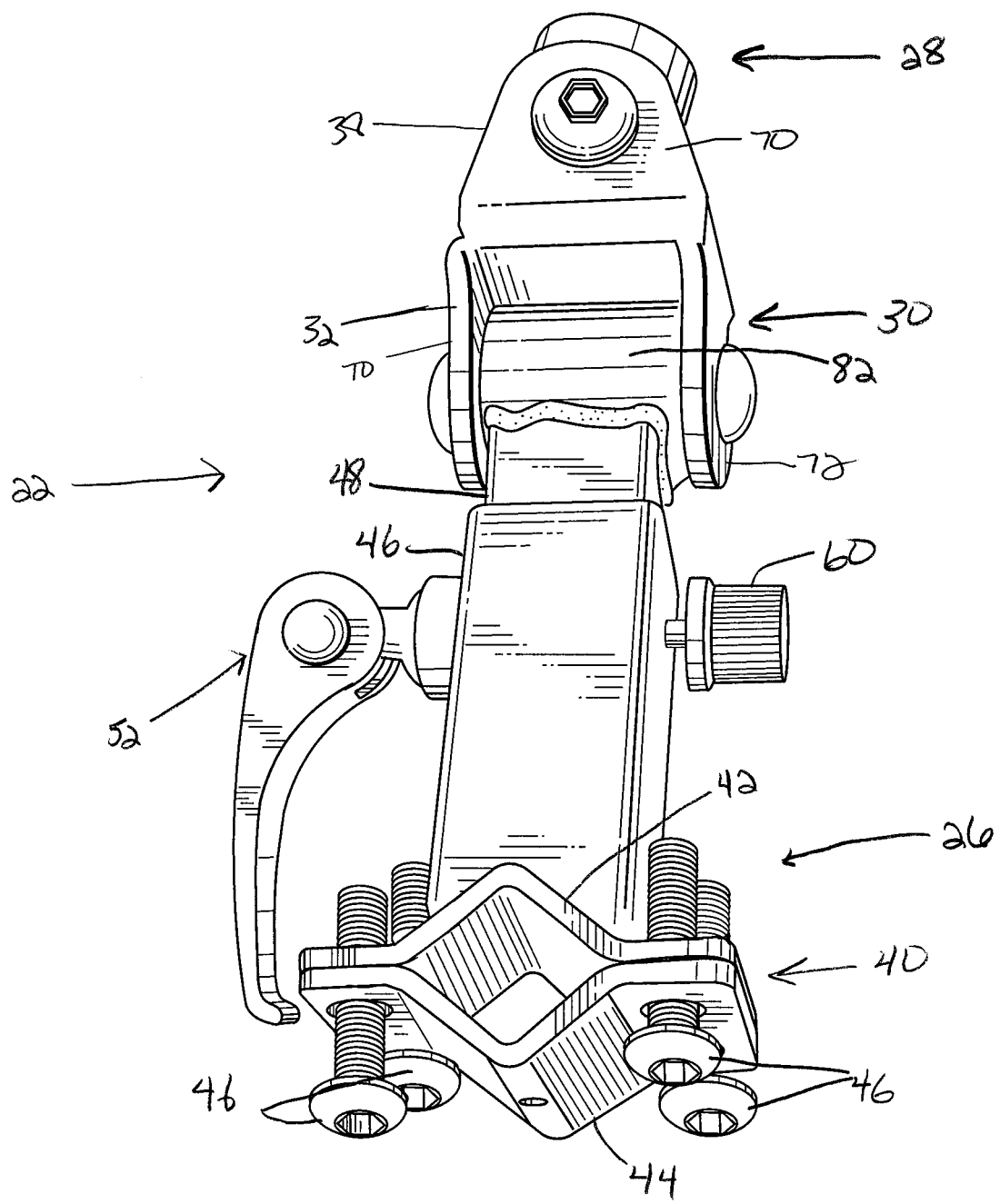
FIG. 2 is a top perspective view of one form of a pivoting bicycle link including a pinch-type securing device at a pivot.
Figure 3:
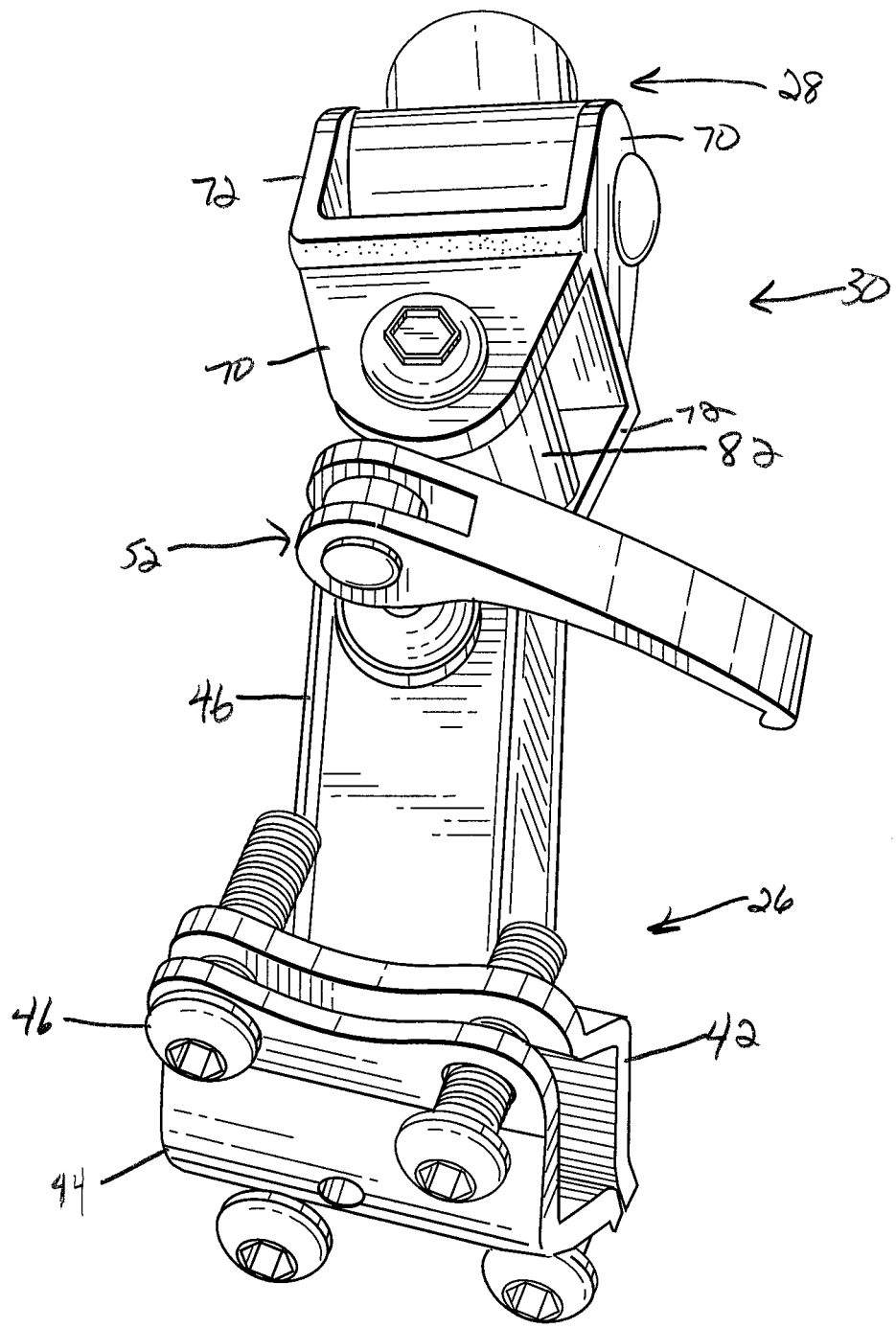
FIG. 3 is a side perspective view of the pivoting bicycle link of FIG. 2.
Figure 4:
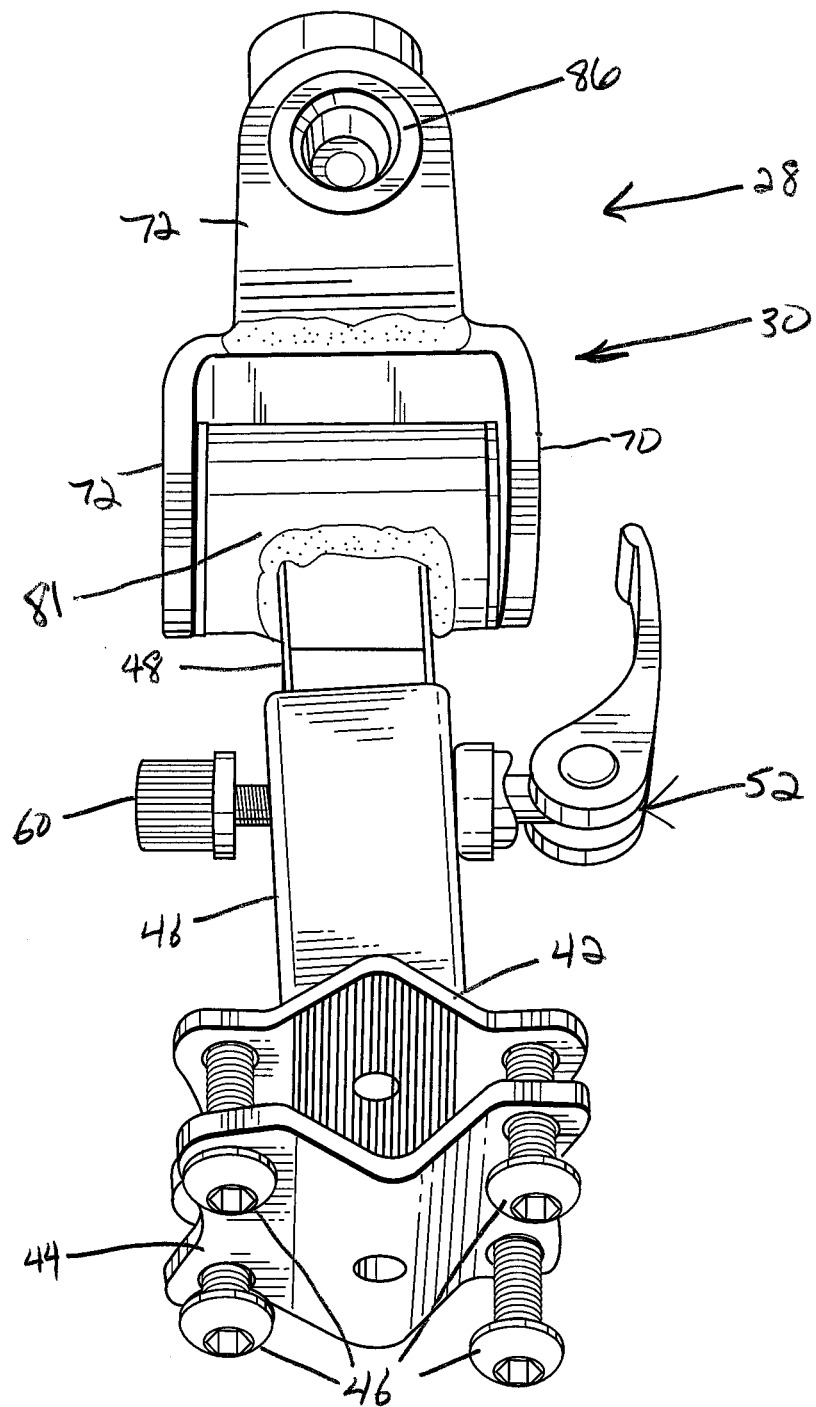
FIG. 4 is a bottom perspective view of another form of pivoting bicycle link including a collar at the pivot.
Figure 5:
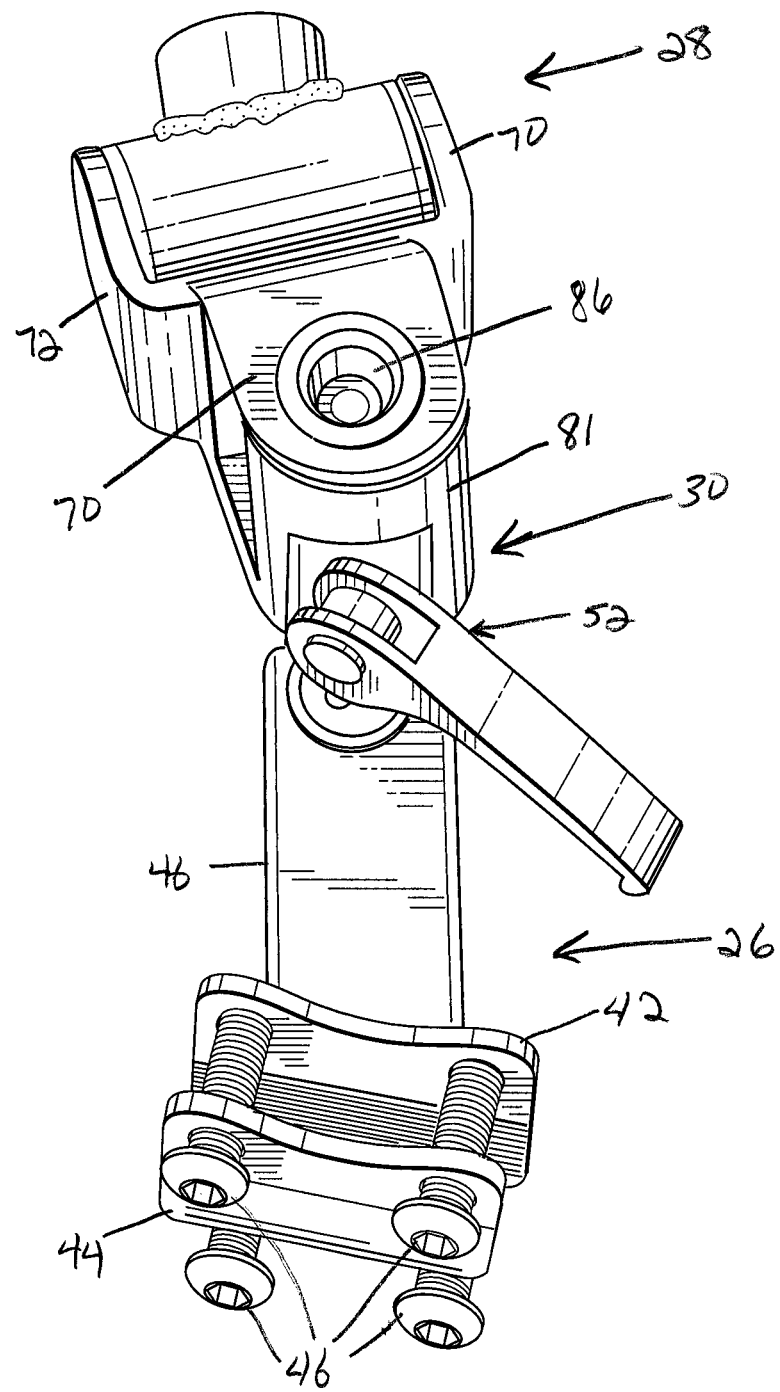
FIG. 5 is a side perspective view of the pivoting bicycle link of FIG. 4.
Figure 6:
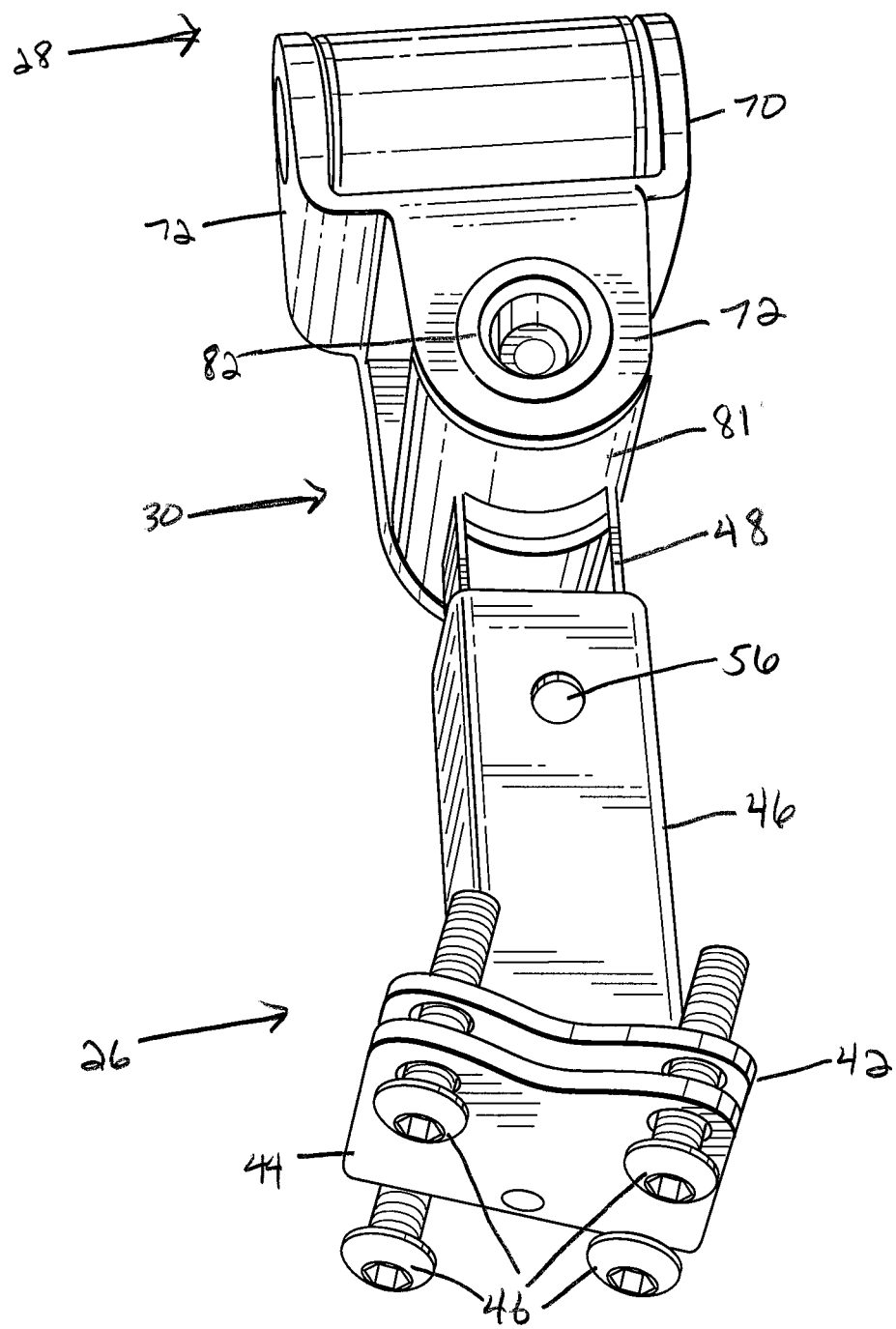
FIG. 6 is a side perspective view of the pivoting bicycle link of FIG. 4 with a quick release removed therefrom.

One form of the link 22 is shown in FIGS. 2 and 3. In this form, the generally U-shaped portions 32,38 each include first and second generally opposing arms 70,72. It should be noted that in one form, each of the U-shaped portions 32,38 include first and second generally opposing arms 70,72. The first arm 70 defines a first opening 74 and the second arm 72 defines a second opening 76. The openings 74,76 are configured to receive the collar 34. In one form, the U-shaped portions 32,38 are each configured to abut a bushing 80 contained in a receiver 82 to help reduce friction at the pivot 30.

As seen in FIG. 7 the collar 34 extends about and through the U-shaped portions 32,38 of the pivot 30. In this regard, the collar 34 has a first collar portion 82 having a first flange 84 and a second collar portion 86 having a second flange 88. The collar portions 82,86, when installed, have a length L between the flanges 84,86 such that the flanges 84,86 contact the arm 70,72 of the U-shaped portion 32,38 to retain the collar 34 in the pivot 30 while maintaining the internal bushing 80 and receiver 81 therein.

In one form, the collar 34 has a length such that does not cause over-compression of the U-shaped portion 32,38 and may minimize binding or restriction of movement of the pivot 30. In other words, the first and second collar portions 82,86 abut one another when installed such that the length between the flanges 84,88 is not so small that the collar 34 over-compresses the U-shaped portion 32,38 and the bushing 80.

Further, in one form, the first and second collar portions 82,86 include additional features to help secure the pivot 30. In one form, the first collar portion 82 may include a keyed portion 90 and an elongated portion 92 which may include a threaded bore 94. Further the second collar portion 84 may include a recessed bore 96 to receive the elongated portion 92. In one form, the elongated portion is flared to abut the recessed bore 96. When installed, a bolt 98 may be inserted through the second collar portion 86 through the recessed bore 96 and engage the threaded bore 94. To tighten, a tool such as an allen key may be inserted into the keyed portion 90 to maintain the position of the first collar portion while a further tool may engage the bolt 98.

Figure 10:
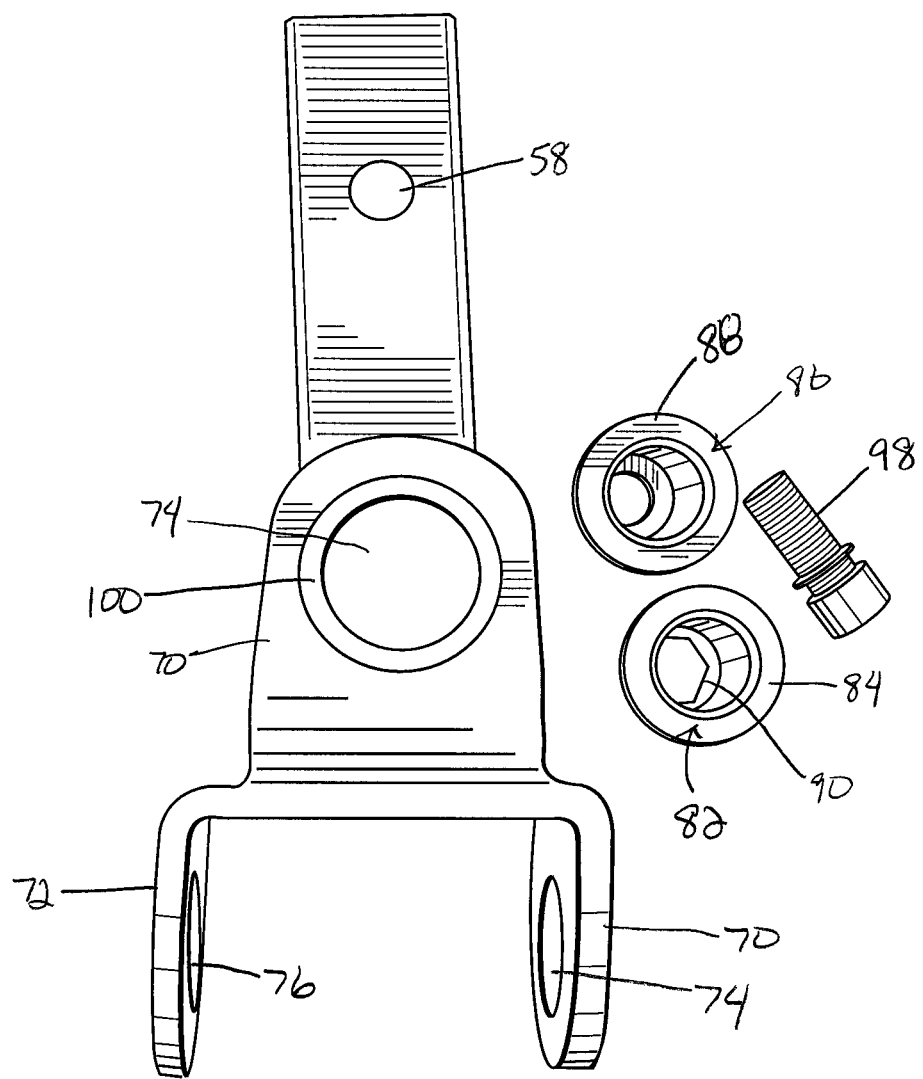
FIG. 10 is a side view of the second portion with a portion of the pivot disassembled.

Further, as shown in FIG. 10, it should be noted that the U-shaped portion 32,38 may include a recessed portion 100 to receive and/or contact the flange of the collar portions 82,86 such that the flanges 84,88 are relatively flush to the exterior of the U-shaped portion 32,38. In other words, in this configuration, the collar 34 would not extend substantially beyond the profile of the U-shaped portion 32,38. Additionally, the collar 34 may include one or more caps (not shown) to cover the open portions of the collar 34 and prevent debris from entering.

As illustrated in FIG. 7, in one form, the link 22 may be disassembled/assembled into the individual components. In the regard, the pivot 34 may be cleaned and the bushing 80 may be replaced if it becomes worn. Further, the first and/or second portion 26,28 may be replaced or swapped between different towing bicycles and also between different wheeled trailers.

Figure 9:
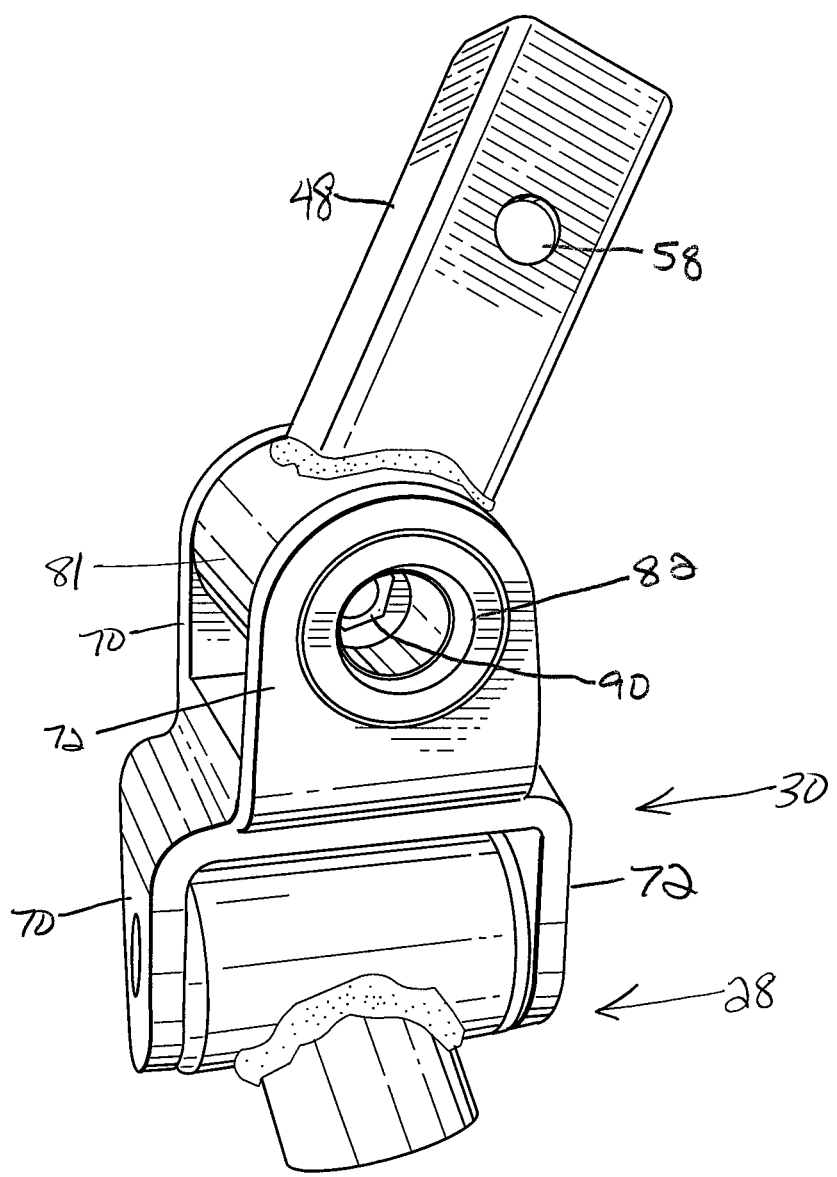
FIG. 9 is a side view of the second portion.

As shown in FIG. 9, in one form, the pivot 30 is positioned on the second portion 28. The pivot 30 may also be positioned on the first portion 26 and/or also positioned such that the pivot 30 is located on both the first and second portions 26,28.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A pivoting bicycle link for interconnecting a bicycle and a wheeled device pulled behind the bicycle, the pivoting bicycle link comprising:
    a first portion configured to operably couple the link to the bicycle;
    a second portion configured to operably couple the link to the wheeled device; and
    a pivot located between the first and second portions to permit the link to move about at least one axis;
    a generally U-shaped portion having first and second generally opposing arms to receive at least a portion of the pivot therebetween; and
    a collar configured to extend between the first and second generally opposing arms and through the pivot, the collar having a length configured to limit compression of the U-shaped portion.

2. The pivoting bicycle link of claim 1 further comprising a quick release to permit the first portion to be separated from the second portion.

3. The pivoting bicycle link of claim 1 wherein the first portion is configured to releasably connect to a portion of the bicycle.

4. The pivoting bicycle link of claim 1 wherein the second portion is integral with the wheeled device.

5. The pivoting bicycle link of claim 1 further comprising a bushing at the pivot to reduce friction at the pivot.

6. The pivoting bicycle link of claim 1 wherein the pivot is a universal joint.

7. The pivoting bicycle link of claim 1 wherein the pivot includes two pivoting linkages, each of the pivoting linkages including a collar.

8. The pivoting bicycle link of claim 1 wherein the collar includes a first collar end having a first flange, a second collar end having a second flange and a fastener to couple the first and second collar ends to one another.

9. A pivoting bicycle link for interconnecting a bicycle and a wheeled device pulled behind the bicycle, the pivoting bicycle link comprising:
    a first portion configured to operably couple the link to the bicycle;
    a second portion configured to operably couple the link to the wheeled device;
    a pivot located between the first and second portions to permit the link to move about at least two axes; and
    a collar configured to operably couple the pivot to at least one of the first and second portions, the collar having a length configured to limit compression of the pivot.

10. The pivoting bicycle link of claim 9 further comprising a quick release to permit the first portion to be separated from the second portion.

11. The pivoting bicycle link of claim 9 wherein the collar includes a first collar end having a first flange, a second collar end having a second flange and a fastener to couple the first and second collar ends to one another.

12. The pivoting bicycle link of claim 9 wherein the first portion is configured to releasably connect to the bicycle.

13. The pivoting bicycle link of claim 9 wherein the second portion is integral with the wheeled device.

14. The pivoting bicycle link of claim 9 further comprising a bushing at the pivot to reduce friction at the pivot.

15. The pivoting bicycle link of claim 9 wherein the pivot is a universal joint.

16. The pivoting bicycle link of claim 9 wherein the pivot includes two pivoting linkages, each of the pivoting linkages including a collar.

17. A pivoting bicycle link for interconnecting a bicycle and a wheeled device pulled behind the bicycle, the pivoting bicycle link comprising:
    a first portion configured to operably couple the link to the bicycle;
    a second portion configured to operably couple the link to the wheeled device; and
    at least one pivot located between the first and second portions to permit the link to move about at least two axes;
    a generally U-shaped portion having first and second generally opposing arms to receive at least a portion of one pivot therebetween, the first arm defining a first opening and the second arm defining a second opening; and
    a collar configured to extend between the first and second generally opposing arms and through the pivot, the collar including a first collar portion having a first flange and a second collar portion having a second flange, the first collar portion positioned in the first opening and contacting the first arm, the second collar portion positioned in the second opening and contacting the second arm, the first and second collar portions contacting one another such that the first and second collar portions have a length between the first and second flanges configured to limit compression of the U-shaped portion.

18. The pivoting bicycle link of claim 17 wherein the first collar portion includes a keyed opening and a threaded bore to receive a fastener extending from the second collar portion.

19. The pivoting bicycle link of claim 18 wherein the threaded bore is configured to extend from the first collar portion and into an opening in the second collar portion.

20. The pivoting bicycle link of claim 17 further comprising a second U-shaped portion and a second collar to receive and secure a second pivot.

* * * * *